Figure 1:
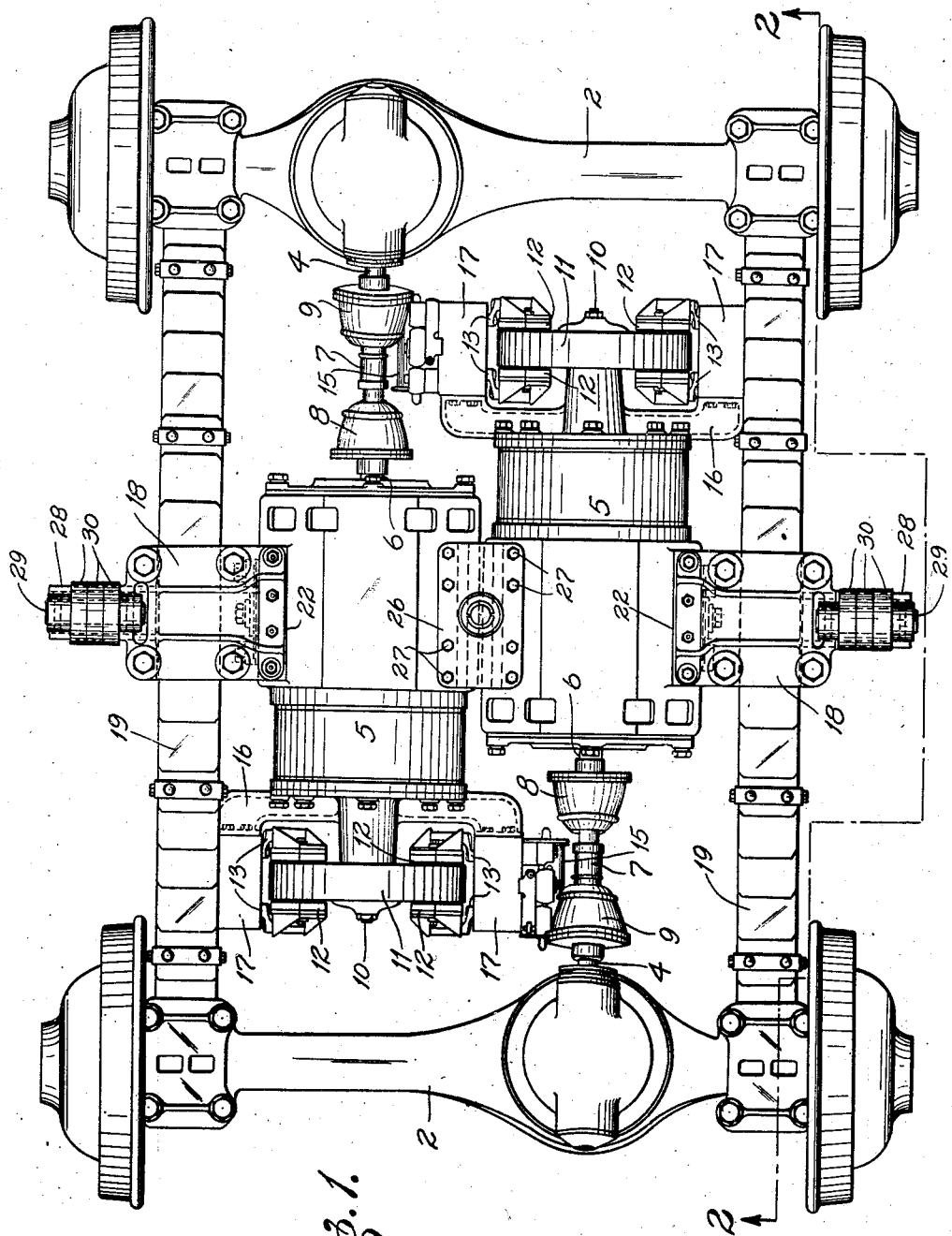

May 12, 1931.  N. R. BROWNYER  1,805,438
ELECTRIC CAR TRUCK
Filed Dec. 14, 1929   2 Sheets-Sheet 1

INVENTOR:
Nelson R. Brownyer
HIS ATTORNEYS.

May 12, 1931.   N. R. BROWNYER   1,805,438
ELECTRIC CAR TRUCK
Filed Dec. 14, 1929   2 Sheets-Sheet 2
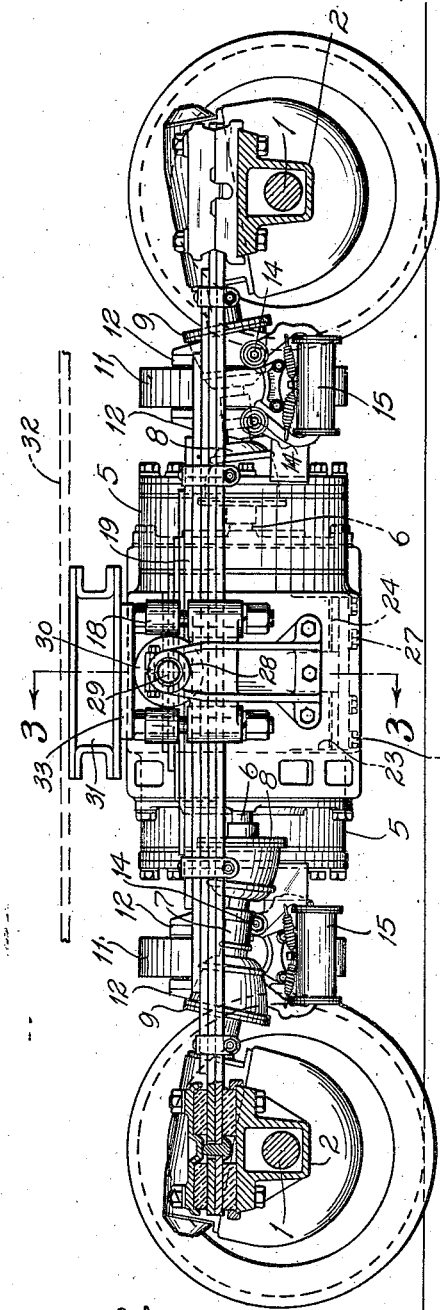
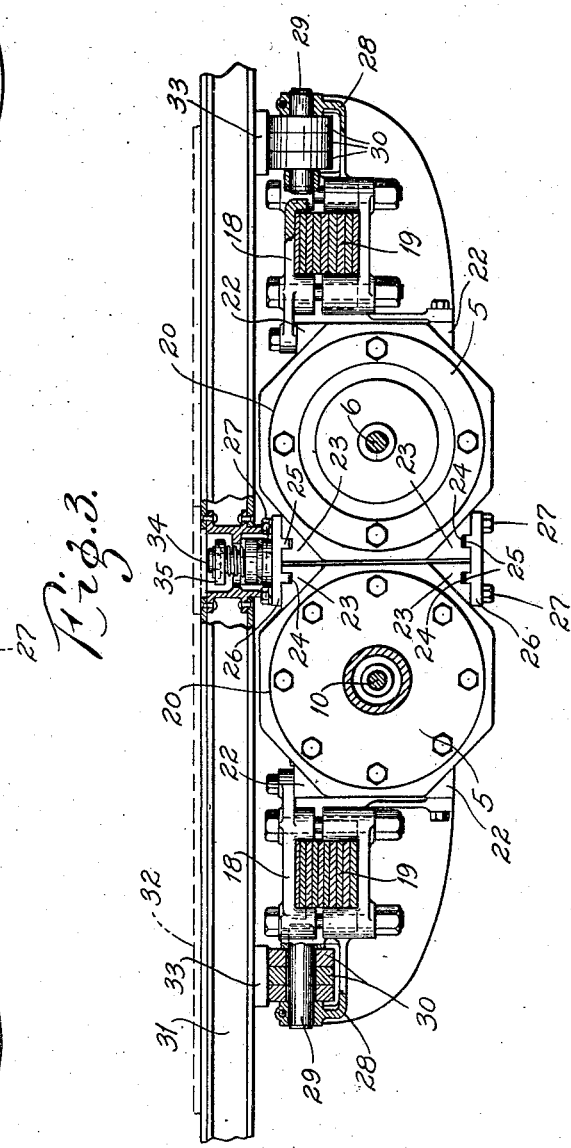
INVENTOR:
HIS ATTORNEYS Patented May 12, 1931

1,805,438

UNITED STATES PATENT OFFICE

NELSON R. BROWNYER, OF DETROIT, MICHIGAN, ASSIGNOR TO THE TIMKEN-DETROIT AXLE COMPANY, OF DETROIT, MICHIGAN, A CORPORATION OF OHIO

ELECTRIC CAR TRUCK

Application filed December 14, 1929. Serial No. 413,993.

My invention relates principally to trucks of the type used with electric street cars. Its principal objects are to simplify the construction, reduce weight, dispense with parts heretofore needed, permit the use of smaller road wheels, provide for the lowering of the floor of the car, decrease the cost of manufacture and facilitate repair.

The invention consists principally in mounting the motors in a load sustaining housing member whose ends rest on the side springs of the truck, thus dispensing with the usual truck bolster and framing. It also consists in coupling the armature shaft of the motor thus mounted to the propeller shaft through an intermediate shaft coupled therewith by a universal joint at each end thereof. It also consists in supporting the brake mechanism on the motor housing member. It also consists in the parts and in the arrangements and combinations of parts hereinafter described and claimed.

In the accompanying drawing which forms part of this specification and wherein like numerals refer to like parts wherever they occur, Fig. 1 is a plan view of a truck embodying my invention;

Fig. 2 is partly a side elevation and partly longitudinal section on the line 2—2 of Fig. 1, showing also part of the car body bolster; and Fig. 3 is partly an end elevation and partly cross section on the line 3—3 of Fig. 2.

According to the present invention, the axles or shaft sections 1 upon which the traction or road wheels are mounted, are themselves rotatably mounted in housings 2 provided therefor after the general manner of an automotive driving axle. Each axle is provided with a ring gear preferably a worm gear ring, which is driven by a propeller shaft 4 provided with a suitable pinion or worm and operatively connected to a driving motor 5. The rotatable axle 1 may be a "solid axle," or it may comprise two sections with a differential gear interposed between them after the manner customary in automotive construction.

The truck is provided with two electric motors 5 arranged side by side about midway of the two axles of the truck and with their shafts 6 extending longitudinally of the truck, one shaft being operatively connected to the front axle and the other being operatively connected to the rear axle. The driving connection comprises a short telescoping transmission shaft 7 coupled at one end to the armature shaft by means of one universal joint 8 and coupled at its other end to the pinion or worm shaft by means of a second universal joint 9.

The commutator end 10 of the armature shaft projects beyond the main body of the motor housing and has a suitable brake disk 11 mounted thereon. On opposite sides of said brake disk are friction members or brake shoes 12. Mounted on crank arms 13 are rock shafts 14 whose operating arms bear against piston provided therefor in a cylinder 15 that communicates with a suitable source of pressure. This type of brake is fully shown and described in the pending application of Herbert W. Alden and Nelson R. Brownyer Serial No. 347,481 filed March 16, 1929 to which reference is made in lieu of further description. The brake illustrated in said application is mounted on brackets that are in turn mounted on a cross member of the truck frame. In the present construction, the brake mechanism is mounted in brackets 16 that are fixed to or integral with the end member of the armature housing, there being two bracket members extending radially horizontally in opposite directions and terminating in yoke arms 17 that extend beyond the brake disk and furnish the support for the several rock shafts and actuating cylinders.

The truck also comprises a transverse housing member 18 with its ends secured to and supported by the side springs 19 of the truck. This housing member is provided with suitable chambers 20, for housing the respective motors, whose weight is carried thereby directly to the side springs of the truck. In the construction illustrated in the drawing, this housing member is made up of two individual motor housings of common type secured together and provided on opposite sides with extension brackets 22. The individual motor housings may be secured together in any suitable way. The bottom parts of the individual motor housings are preferably provided with lugs 23, as by welding the lugs thereon, and said lugs are provided with grooves or notches 24 to receive mating ribs 25 provided therefor on strap members 26 that are secured in place by cap screws 27. The extension brackets may be secured to the motor housing in like manner or by welding. These bracket members are suitably shackled to the side springs of the truck and the outer end 28 of each bracket is provided with a horizontal longitudinally extending pin 29 on which are journaled a number of rollers 30 that serve as a side bearing for the car body bolster 31.

The car body comprises a body bolster that supports the floor 32 of the car and is provided on its under side with a bearing or wear plate 33 in the form of a circular arc that rests on the rollers of the housing member as above described.

Midway of its length the body bolster is provided with a member that has a central perforation adapted to receive a centering pin 34 provided therefor on the transverse housing member. The upper end of this centering pin is threaded and provided with a nut 35 that is accessible through an opening provided therefor in the floor of the car.

By the foregoing arrangement, the weight of the car is applied to the end portions of the housing member and thence to the side springs of the truck, and the weight of the motors is carried by the housing member directly to the side springs of the truck. Thus the usual bolster is dispensed with as well as the frame used for supporting the motors. By thus dispensing with these parts, it becomes feasible to lower the floor of the car into the space, thus made available, and it also becomes feasible to use wheels of smaller diameter than is practicable with the old construction.

By reason of the motors being supported on the side springs, their elevation is subject to considerable change as the load varies; and by reason of the short distance of the motor from the axle driven thereby, this change of elevation causes a considerable change in the angular relation of the armature shaft to the propeller shaft. This change in the angular relation extends from the condition of the car when heavily loaded to the condition existing in the factory or repair shop when the weight of the body is entirely removed from the truck. To offset the effect of this wide range of variation on the angularity of the armature shaft with relation to the propeller shaft, each of said shafts is coupled through a separate universal joint to the short transmission shaft. Thus it is feasible to mount the worm shaft above the worm and thus obtain adequate ground clearance even with road wheels of small diameter.

It is an important feature of the present invention that the brake mechanism is mounted on the housing member.

What I claim is:

1. A car truck comprising wheeled axles, housings therefor, side springs connecting the axle housings, a transverse housing member mounted on said side springs, and motors mounted in said housing member and operatively connected respectively to said axles to actuate the same, each connection comprising two universal joints.

2. A car truck comprising wheeled axles, housings therefor, side springs connecting the axle housings, a transverse housing member mounted on said side springs, motors mounted in said housing member and operatively connected respectively to said axles to actuate the same, and brake mechanism mounted on said transverse housing member.

3. The combination of a car body and bogie trucks therefor, each truck comprising wheeled axles, housings therefor, side springs connecting the axle housings, a transverse housing member mounted on said side springs and extending beyond them, and motors mounted in said housing member and operatively connected respectively to said axles to actuate the same said car body resting on the portions of said housings beyond said springs.

4. The combination of a car body and bogie trucks therefor, each truck comprising wheeled axles, housings therefor, side springs connecting the axle nousings, a transverse housing member mounted on said side springs, motors mounted in said housing member and operatively connected respectively to said axles to actuate the same, and brake mechanism for the respective motors mounted on said housing member.

5. The combination of a car body and bogie trucks therefor, each truck comprising wheeled axles, housings therefor, side springs connecting the axle housings, a transverse housing member mounted on said side springs and extending beyond them, and motors mounted in said housing member and operatively connected respectively to said axles to actuate the same, said car body resting on the end portions of the transverse housing member beyond the springs.

6. The combination of a car body and bogie trucks therefor, each truck comprising wheeled axles, housings therefor, side springs connecting the axle housings, a transverse housing member mounted on said side springs, motors mounted in said housing member and operatively connected respectively to said axles to actuate the same, and brake mechanism mounted on said transverse housing member, said car body resting on the end portions of the transverse housing members.

7. The combination of a car body and bogie trucks therefor, each truck comprising wheeled axles, housings therefor, side springs connecting the axle housings, a transverse housing member mounted on said side springs and pivotally connected midway of its length to said car body, and two motors arranged side by side on opposite sides of said pivotal connection and mounted in said housing member, one of said motors being operatively connected to one of said axles to actuate the same, and the other motor being operatively connected to the other axle to actuate it.

8. The combination of a car body and bogie trucks therefor, each truck comprising wheeled axles, housings therefor, side springs connecting the axle housings, two motors arranged side by side and operatively connected respectively to said axles to actuate the same, a housing for each motor, and an extension bracket on the outer side of each housing and supported by the adjacent side spring, said motor housings being secured together to form a load sustaining member through which the weight of the motors is supported by said springs.

9. The combination of a car body and bogie trucks therefor, each truck comprising wheeled axles, housings therefor, side springs connecting the axle housings, a transverse housing member mounted on said side springs, motors mounted in said housing member and brake mechanisms mounted on said transverse housing member, one end of each motor shaft being operatively connected to one of said axles and the other end of said motor shaft being operatively related to one of said brake mechanisms, said car body being supported by the end portions of the transverse housing members.

10. A car truck comprising wheeled axles, truck side members connecting said axles, and motors operatively connected respectively to said axles to actuate the same, said motors comprising individual housings and said housings being rigidly united together and connected to said truck side members, whereby the usual truck bolster is dispensed with.

11. A car truck comprising wheeled axles, truck side members connecting said axles, and motors operatively connected respectively to said axles to actuate the same, said motors being arranged side by side between said axles with their axes disposed longitudinally of said truck and the housings of the respective motors being rigidly connected together to constitute a load supporting member which rests on the respective truck side members.

12. A car truck comprising wheeled axles, truck side members connecting said axles, and motors operatively connected respectively to said axles to actuate the same, said motors being arranged side by side between said truck side members with their axes disposed longitudinally of said truck, means for rigidly securing together said motors, and extension brackets on said motors which are secured respectively to said truck side members.

13. The combination of a car body and a bogie truck therefor, said truck comprising wheeled axles, truck side members connecting said axles, and a transverse member connecting said truck side members intermediate between said axles, said transverse member comprising motors, operatively connected to said axles to actuate the same, said motors being arranged side by side with their axes disposed longitudinally of said truck and being rigidly connected together and to the respective truck side members, said motors being provided with extensions that extend beyond the respective truck side members and said car body resting on said extensions of said motors.

Signed at Detroit, Michigan, this 5th day of December, 1929.

NELSON R. BROWNYER.